US012722602B2

(12) United States Patent
Geiger et al.

(10) Patent No.: US 12,722,602 B2
(45) Date of Patent: Sep. 1, 2026

(54) METHOD AND AXLE GEOMETRY SETTING SYSTEM FOR STANDARD SETTING OF AN AXLE GEOMETRY OF VEHICLE AXLES OF A VEHICLE AXLE SERIES

(71) Applicant: Bayerische Motoren Werke Aktiengesellschaft, Munich (DE)

(72) Inventors: Josef Geiger, Schaufling (DE); Matthias Speiseder, Geiselhoering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/114,833

(22) PCT Filed: Sep. 19, 2023

(86) PCT No.: PCT/EP2023/075735
§ 371 (c)(1),
(2) Date: Mar. 25, 2025

(87) PCT Pub. No.: WO2024/068353
PCT Pub. Date: Apr. 4, 2024

(65) Prior Publication Data

US 2026/0138569 A1 May 21, 2026

(30) Foreign Application Priority Data

Sep. 28, 2022 (DE) ..................... 10 2022 124 885.2

(51) Int. Cl.
*B60S 5/00* (2006.01)
*B62D 17/00* (2006.01)

(52) U.S. Cl.
CPC ................ *B60S 5/00* (2013.01); *B62D 17/00* (2013.01)

(58) Field of Classification Search
CPC ................................ B60S 5/00; B62D 17/00
(Continued)

(56) References Cited

U.S. PATENT DOCUMENTS 4,424,984 A 1/1984 Shiratori et al.
5,027,275 A 6/1991 Sakamoto et al.
(Continued)

FOREIGN PATENT DOCUMENTS

DE 32 12 842 A1 11/1982
DE 38 87 479 T2 5/1994
(Continued)

OTHER PUBLICATIONS

International Search Report (PCT/ISA/210) issued in PCT Application No. PCT/EP2023/075735 dated Jan. 9, 2024 with English translation (5 pages).

(Continued)

*Primary Examiner* — Andrew Joseph Rudy
(74) *Attorney, Agent, or Firm* — Crowell & Moring LLP

(57) ABSTRACT

A method for standard setting an axle geometry setting of axles of a vehicle axle series. A link arrangement of is adjusted into a series-specific $K_0$ position and loaded with a predefined fraction of a series-specific predetermined $K_0$ force. A first axle geometry actual value is measured. The link arrangement is then loaded with 100% of the $K_0$ force, and a second axle geometry actual value is measured. A supplementary setting angle is determined which characterizes a difference between the axle geometry actual values. A target angle which corresponds to the axle geometry setting is determined for an eccentric element of a setting eccentric unit of the vehicle axle, by a setting angle which corresponds to an axle geometry setpoint value and a first supplementary setting angle being summed, wherein the eccentric element (Continued)

is rotated by the target angle in a setting process (E) for setting the axle geometry setting.

15 Claims, 2 Drawing Sheets

(58) Field of Classification Search
USPC .......................................................... 701/33.1
See application file for complete search history.

(56) References Cited

U.S. PATENT DOCUMENTS

| | | | |
|---|---|---|---|
| 6,154,970 A | 12/2000 | Reichelt et al. | |
| 6,976,035 B1 * | 12/2005 | Lapstun | G06F 3/04883 |
| 12,098,917 B2 * | 9/2024 | Nourdine | G01B 5/0009 |
| 2002/0113396 A1 | 8/2002 | Lee | |
| 2016/0121676 A1 | 5/2016 | Drabon et al. | |

FOREIGN PATENT DOCUMENTS

| | | |
|---|---|---|
| DE | 196 34 505 C1 | 11/1997 |
| DE | 10 2009 005 889 A1 | 8/2010 |
| DE | 10 2011 102 385 A1 | 1/2012 |
| DE | 10 2014 116 077 B4 | 1/2017 |

OTHER PUBLICATIONS

German-language Written Opinion (PCT/ISA/237) issued in PCT Application No. PCT/EP2023/075735 dated Jan. 9, 2024 with English translation (9 pages).

German-language Search Report issued in German Application No. 10 2022 124 885.2 dated Aug. 2, 2023 with partial English translation (10 pages).

* cited by examiner

METHOD AND AXLE GEOMETRY SETTING SYSTEM FOR STANDARD SETTING OF AN AXLE GEOMETRY OF VEHICLE AXLES OF A VEHICLE AXLE SERIES

BACKGROUND AND SUMMARY

The present disclosure relates to a method for standard setting of an axle geometry of vehicle axles of a vehicle axle series. The setting of the respective axle geometry of the vehicle axles of the vehicle axle series is carried out by way of the method while the relevant vehicle axle or the vehicle axle to be set is not yet installed in a motor vehicle. This means that the method for setting the corresponding vehicle axles is part of a production method of vehicle axles or of motor vehicles. Furthermore, the disclosure relates to an axle geometry setting system configured to carry out the method. This means that the axle geometry setting system has the capability to carry out the method. Furthermore, the disclosure extends to a computer program which has commands that cause the axle geometry setting system to carry out the method. Moreover, the disclosure relates to a computer-readable storage medium, on which the computer program is stored.

Presently, toe and camber values of chassis are set automatically or semiautomatically in the context of an axle preassembly with the aid of so-called toe-camber setting systems. A wheel contact force to be taken into consideration when setting the toe and camber values is simulated by a spring-loading unit. Due to the setting of the axle geometry in/on the toe-camber setting system, deviations occur between a desired toe and/or camber value, as is supposed to result in the completed motor vehicle, and a toe and/or camber value resulting on the vehicle axle connected to the toe-camber setting system. A further deviation between the desired toe and/or camber value and the actual toe and/or camber value results from countering of corresponding setting elements of the vehicle axle. Therefore, the toe and camber values are currently set in the axle preassembly in cooperation with a tolerance value compensating for the deviation. The tolerance values presently have to be empirically ascertained for each vehicle axle series—sometimes in multiple control loops—and manually trained. For this purpose, highly-specialized personnel are presently required who ascertain the tolerance values and train the machines participating in the toe and camber settings each time a different vehicle axle series is to be manufactured in the axle preassembly, for example, for a different vehicle or for a different vehicle derivative. In this way, a uniform setting quality of the vehicle axles cannot be ensured, since the quality of the empirically ascertained tolerance values depends on personal experience of the participating worker.

DE 10 2011 102 385 A 1 discloses a method for setting a toe of a vehicle axle, in which an eccentric element is released in that a locking element for locking the eccentric element is loosened by way of a tool device, which is held on a robot and guided by the robot. The eccentric element is then rotated around its axis of rotation to set the toe and the eccentric element is locked again.

A method for actively setting camber and toe of a wheel of a motor vehicle is described in DE 10 2009 005 889A1 . For this purpose, a force acting on the wheel and/or a torque acting on the wheel is measured as a measured variable by way of a setting device and then the camber and/or the toe of the wheel are set depending on this measured variable.

An object of the disclosure is to provide a solution for being able to automatically set an axle geometry particularly reliably and with particularly high repetition quality in the context of a production of vehicle axles.

According to the disclosure, a method for standard setting of an axle geometry of vehicle axles of a vehicle axle series is proposed. This means that the method is not intended to perform the setting of the axle geometry on the vehicle axles when the vehicle axles already form a component of the motor vehicle in the intended installation position. Instead, the method is intended to perform the setting of the axle geometry of the vehicle axles before the vehicle axles are attached to a frame of a motor vehicle, for example in the context of or after a production of the vehicle axles. The disclosure moreover proposes an axle geometry setting system which is configured to carry out the method, thus for standard setting of the axle geometry of vehicle axles of the vehicle axle series. The axle geometry setting system comprises functionality for this purpose in order to carry out the method. In particular, for example, the axle geometry setting system comprises an EDP control unit, thus a control unit which is configured for electronic data processing. The control unit may comprise a controller or processor for purposes of executing computer programs, software, instructions, and/or logic stored in a memory.

The disclosure furthermore relates to a computer program for a control unit configured for electronic data processing, in particular for the control unit of the axle geometry setting system. The computer program comprises control commands which cause the control unit, in particular the axle geometry setting system comprising the control unit, to carry out the steps of the method. Due to execution or processing of the computer program or its control commands by way of the control unit configured for electric data processing, it provides output control commands which characterize the steps of the method, wherein the output control commands are accepted by the axle geometry setting system as input control commands. The disclosure additionally extends to a computer-readable storage medium, thus to a data carrier on which the computer program is stored.

The method according to the disclosure comprises a training process and a setting process. A first vehicle axle to be set of the vehicle axle series is subjected to the training process. This means that in the training process of the method, training process steps are carried out on the first vehicle axle to be set of the vehicle axle series.

Before the training process steps it is provided in particular that—if this has not yet taken place—a starting situation for the respective vehicle axle to be set is produced. The starting situation comprises that a series-specific trace code is specified, which characterizes a desired axle geometry. Accordingly, the trace code in particular contains data which characterize an axle geometry setpoint value for the vehicle axles to be set of the vehicle axle series. This means that the trace code comprises data which characterize, for example, a toe setpoint value, a camber setpoint value, and/or a leading/trailing setpoint value. The trace code is specified to the method, for example, to the training process and/or the setting process, as a foundation or as an input variable. In order to perform the corresponding axle geometry setting on the corresponding vehicle axle later in the method, one setting-relevant link of a link assembly of the vehicle axis or multiple setting-relevant links of the link assembly are adjusted. If the link assembly comprises further links, in particular those which are not relevant for the axle geometry setting, the starting situation includes that fasteners of the non-setting-relevant links are permanently fixed, for example, screwed down. A respective setting eccentric unit of the respective vehicle axle or the respective link assembly is only pre-tightened according to the starting situation, for example, using a tightening torque of 40 Nm to 120 Nm. An angle setting of a respective eccentric element of the respective setting eccentric unit is undefined in this case.

The method is designed to carry out the setting of the axle geometry on different types of vehicle axles, i.e. link assemblies. For example, multi-link axles (in particular spatially-functional five link axles), integral link axles, trapezoid link axles, sword link axles, composite link axles, and further axle types known to a person skilled in the art, in which an axle geometry is settable, come into consideration. Vehicle axle is to be understood herein as a construction which comprises one respective (in the installed position: a right and a left) wheel suspension or link assembly per side (in the installed position: on the right vehicle side and on the left vehicle side). For the sake of simpler description, reference is only made to one of the sides of the axles. In particular, the method and the axle geometry setting system are configured to set the axle geometry on rear axles of a rear axle series. It is also conceivable to use the method and the axle geometry setting system for the purpose of setting the axle geometry on front axles of a front axle series. Moreover, the axle geometry can be set on further vehicle axle types by way of the method and the axle geometry setting system, for example, on vehicle axles for utility vehicles arranged between the rear axle and the front axle, etc.

As already indicated, the setting of the axle geometry can comprise the setting of the camber of the vehicle axle. Alternatively or additionally, the setting of the axle geometry can comprise the setting of the toe of the vehicle axle. This means that the method or the axle geometry setting system is used for setting a series-specific camber setting and/or for setting a series-specific toe setting of the vehicle axles. Alternatively or additionally, the setting of the axle geometry can comprise a setting of a leading/trailing value of the vehicle axle. The method can insofar be used for setting a series-specific leading/trailing setting of the vehicle axles. A respective axle geometry which is set on the vehicle axle to be set by way of the method or by way of the axle geometry setting system can comprise a camber setting value, a toe setting value, and/or a leading/trailing setting value or can be formed from the corresponding individual values.

After the production of the starting situation, the vehicle axle to be set is brought into a setting position, for example, connected to the axle geometry setting system and/or chucked therein. For this purpose, for example, an axle carrier of the vehicle axle to be set and the axle geometry setting system are fastened to one another such that a relative movement between the axle geometry setting system and the axle carrier is blocked. An axle carrier-side fixed point of the vehicle axle or its link assembly is thus defined in relation to the axle geometry setting system and fixedly arranged, which means that a movement of the fixed point in relation to the axle geometry setting system is blocked along all spatial directions (x, y, z) in the setting position. The axle carrier-side fixed point is, for example, a linkage point of the vehicle axle, at which an uppermost or frontmost link of the link assembly is linked on the axle carrier.

In a first training process step—for example, by way of a hub lifter of the axle geometry setting system—the link assembly is adjusted into a series-specific $K_0$ position, in which a wheel hub of the vehicle axle and the axle carrier-side fixed point of the link assembly are spaced apart from one another over a $K_0$ distance along the vertical direction (z). The $K_0$ distance characterizing the series-specific $K_0$ position is thus specified from vehicle axle series to vehicle axle series, for example, specifically by vehicle derivative. By setting the $K_0$ distance or by adjusting the link assembly in the $K_0$ position, the links of the link assembly are adjusted in relation to the axle carrier in a predetermined design position in which the setting of the axle geometry can be carried out particularly easily and in particular gently for the components. For example, the $K_0$ distance can be ascertained based on a mass of a body of the relevant motor vehicle, so that the $K_0$ distance also results at the vehicle axle when the vehicle axle is connected in the intended installation position to the frame of the motor vehicle and the motor vehicle rests on the ground via its wheels as intended.

In a second training process step, the link assembly is loaded with a predetermined fraction or proportion of a series-specific predetermined $K_0$ force, for which purpose, for example, a load spring of a spring-loading unit of the axle geometry setting system can be used. The $K_0$ force simulates the force which the body of the motor vehicle would exert on the vehicle axle installed in the intended installation position due to its mass. In order to be able to adjust or set the axle geometry as simply and/or with as little effort as possible during the production/setting of the vehicle axles, in the second training process step, the link assembly is not loaded with 100% of the $K_0$ force, but rather with the predetermined fraction. For example, in the second training process step, the link assembly is loaded with 25% to 45%, in particular with 35%, of the $K_0$ force. In the second training process step, furthermore a first axle geometry actual value is acquired. Acquiring the axle geometry actual value is to be understood as measuring the corresponding wheel hub or suspension strut inclination in relation to a X-Z plane. In other words: in the second training process step, the corresponding axle geometry actual value, for example, the toe value, the camber value, and/or the leading/trailing value is measured—as this/these is/are represented in the setting position while the link assembly is in the $K_0$ position and is loaded with the predetermined fraction of the $K_0$ force. For this purpose, for example, in place of an angular position of a wheel plane (X-Z plane of the corresponding wheel) in space, an angular position of a brake disc, a rim contact surface, etc. can be measured. The corresponding axle geometry actual value is in particular stored for the further method. In the second training process step, a first force-distance value pair can moreover be acquired which characterizes a tensioning travel of the loading spring until reaching the predetermined fraction of the $K_0$ force.

For a third training process step and during the third training process step, the link assembly is held in the $K_0$ position, wherein the link assembly is loaded with 100% of the $K_0$ force by way of the loading spring. In this state, a second axle geometry actual value is acquired, which means that toe, camber, and/or leading/trailing of the link assembly located in the $K_0$ position and loaded with 100% of the $K_0$ force are/is measured. In the third training process step, moreover a second force-distance value pair can be acquired which characterizes a tensioning travel of the loading spring until reaching 100% of the $K_0$ force.

In a fourth training process step, a first supplementary setting angle functioning as a first tolerance value is ascertained, which characterizes a difference between the first axle geometry actual value and the second axle geometry actual value. This is carried out in particular on the basis of a predetermined mathematical algorithm. In other words, the first axle geometry actual value and the second axle geometry actual value are compared with one another, wherein the first supplementary angle results or is calculated directly from a comparison result.

After the first vehicle axle to be produced or set has passed through the training process, the first vehicle axle to be set is subjected to the setting process of the method. In the context of the setting process, the setting of the axle geometry takes place, i.e., for example, the setting of the toe, the camber, and/or the leading/trailing. To set the axle geometry, first a target angle, which corresponds to the desired axle geometry, is ascertained for the eccentric element of the setting eccentric unit of the vehicle axle. In other words, the target angle is a special angle by which the eccentric element is to be rotated so that in the setting position of the vehicle axle, for example on the vehicle axle chucked in the axle geometry setting system, a predetermined axle geometry setpoint value results, so that the desired axle geometry results on the completed motor vehicle. The desired axle geometry results on the completed motor vehicle, which is parked on the ground or rests on the ground via its wheels, when the eccentric element was rotated by the target angle by way of the setting process, due to which the axle geometry setpoint value was set on the vehicle axle arranged in the setting position. The target angle is ascertained in that the setting angle corresponding to the axle geometry setpoint value (axle geometry setpoint value setting angle) and the first supplementary setting angle, i.e. the first tolerance value, are summed or added. The first supplementary setting angle is accordingly a positive or negative angle originating from the axle geometry setpoint value setting angle. This also applies to a second and a third setting supplementary angle, which are explained in more detail below.

Setting the vehicle axle of a common vehicle axle series particularly accurately and with uniform tolerance particularly easily and/or with little effort is advantageously made possible on the basis of the method. The link assembly and the eccentric elements participating in the axle geometry setting are advantageously only loaded particularly little in this case when setting the corresponding axle geometry value, namely with the predetermined fraction of the $K_0$ force. Component damage on the vehicle axle is thus avoided. In that the setting of the vehicle axle takes place while it is only loaded with the predetermined fraction of the $K_0$ force and not with 100% of the $K_0$ force, undesired deformation and damage to the setting eccentric unit, in particular of eccentric supports of the setting eccentric unit, is effectively avoided. Reinforcing the setting eccentric unit, in particular the eccentric supports, and/or conceiving/designing particularly stable eccentric supports can be dispensed with, which is economically favorable and resource-preserving. This is because such reinforced eccentric supports would make it necessary to embody the entire sheet-metal part, which comprises the eccentric supports in one piece, having greater wall thickness-a spatially limited or punctiform reinforcement or thickening only in the area of the eccentric supports is not possible or is only possible with an extremely high level of effort. Sheet-metal parts having particularly thick wall thickness run counter to a concept of a motor vehicle which is designed to be as light as possible, however. Likewise, separately produced eccentric support reinforcement parts represent a high development expenditure and an additional process step in the production of conventional vehicle axles, both of which are advantageously dispensed with due to the setting at the fraction of the $K_0$ force.

Moreover, it is advantageous in the method that the setting of the corresponding vehicle axle takes place outside the completed motor vehicle, due to which the setting eccentric unit, in particular its eccentric element, is accessible particularly easily. In this way, a concept for automated setting of the axle geometry, which already takes place outside the motor vehicle, in particular in the context of motor vehicle production, is particularly taken into consideration.

According to a further possible embodiment of the method, two further training process steps are carried out between the third training process step and the fourth training process step. On the one hand, after the third training process step, the link assembly is adjusted into pulse deflection position by way of the hub lifter, in which the wheel hub and the axle carrier-side fixed point are spaced apart from one another along the vertical direction (z) over a pulse peak distance. In this way, the link assembly is held in the pulse deflection position and loaded by way of the loading spring with a predetermined pulse deflection force. The pulse deflection force can be a multiple or a fraction of the $K_0$ force. Furthermore, it can be provided that then a third force-distance value pair is acquired, which characterizes a tensioning travel of the loading spring until reaching the predetermined pulse deflection force.

This embodiment further includes that setting process steps are carried out in the setting process of the method. A first setting process step is a pulse step, in which the link assembly is pulsed or pulsated in that

- by way of the hub lifter, the link assembly is adjusted in the $K_0$ position, wherein the link assembly is loaded with the predetermined fraction of the $K_0$ force by way of the loading spring,
- by way of the hub lifter, the link assembly is adjusted in the pulse deflection position, wherein the link assembly is loaded using the pulse deflection force by way of the loading spring,
- the link assembly is adjusted back into the $K_0$ position and is loaded with the predetermined fraction of the $K_0$ force.

The pulsing of the link assembly or vehicle axle can be executed twice or multiple times, in particular in direct succession, in the context of the method, in particular the setting process. For example, it can be provided that the steering assembly or the vehicle access to be set is pulsed five times.

After the pulsing of the link assembly is completed, in a second setting process step, an axle geometry starting value of the link assembly adjusted into the $K_0$ position and loaded with the $K_0$ force is acquired.

In a third setting process step, a lock nut of the setting eccentric unit is loosened and then tightened with a predetermined preliminary tightening torque. The axle geometry setting system comprises a screwdriver tool for this purpose, for example. The preliminary tightening torque is, for example, 10 Nm. The preliminary tightening torque can correspond to a predetermined final tightening torque, which is described in more detail hereinafter. It is thus provided that the lock nut is initially loosened enough that it and a lock nut contact surface are contact-free in relation to one another, but the eccentric element does not fall out of the vehicle axle to be set. The lock nut is then driven long enough or far enough in the tensioning direction, i.e. screwed onto a lock threaded bolt of the setting eccentric unit, that it rests on the lock nut contact surface and the torque which has to act on the lock nut to drive it has reached the predetermined preliminary tightening torque. In this way, the lock nut of the setting eccentric unit is brought into a defined starting position.

The eccentric element is rotated in a fourth setting process step by the target angle corresponding to the desired axle geometry. Furthermore, in the fourth setting process step, a third axle geometry actual value is acquired or measured.

The axle geometry setting system comprises, for example, a further screwdriver tool for rotating or driving the eccentric element.

The fourth setting process step is followed by a fifth setting process step, in which the lock nut is tightened, specifically with the predetermined final tightening torque. The final tightening torque is at least equal to the preliminary tightening torque or greater than the preliminary tightening torque. Furthermore, in the fifth setting process step, a fourth axle geometry actual value is acquired or measured.

In a sixth setting process step, the link assembly is loaded with 100% of the $K_0$ force by way of the loading spring and a final axle geometry actual value is acquired.

If the vehicle axle is thus pulsed or shaken during the setting of the axle geometry value and/or during the production of the vehicle axle, due to which a preset axle geometry value changes due to bearing movement, changes in the elasto-kinematics of the link assembly, etc., the axle geometry can nonetheless be set particularly reliably, with particularly low tolerance, and with particularly high repetition quality.

In a further possible embodiment of the method, it is provided that the target angle is first set to a rough setting value and later to a fine setting value. This means the eccentric element is first rotated by a rough angle roughly corresponding to the axle geometry setpoint value and later rotated by a fine angle corresponding more accurately to the axle geometry setpoint value. It can be provided here that the rotating of the eccentric element by the rough angle takes place before the pulse step, i.e. before the first setting process step. In particular, it is provided that the rough setting and the fine setting are carried out in the context of the fourth setting process step, in particular in direct succession.

According to a further possible embodiment of the method, further setting process steps are carried out between the fourth setting process step and fifth setting process step. Initially, a second supplementary setting angle functioning as a second tolerance value is ascertained, which characterizes a difference between the third axle geometry actual value and the fourth axle geometry actual value. After this, the lock nut is loosened and tightened again with the predetermined preliminary tightening torque, for example as it was carried out in the second setting process step. To set the axle geometry, first the target angle is ascertained for the eccentric element in that the axle geometry setpoint value setting angle, the first supplementary setting angle, i.e. the first tolerance value, and the second supplementary setting angle, i.e. the second tolerance value, are summed or added. The eccentric element is then rotated by the target angle. After this, the lock nut is tightened again with the predetermined final tightening torque.

In this manner, during the setting of the vehicle axle, the second supplementary setting angle, which can also be referred to as the lock tolerance value, is ascertained in a particularly reliable manner. In that then during the rotation of the eccentric element by the target angle, which characterizes the desired axle geometry setting, an adjustment of the axle geometry caused by the tightening of the lock nut is balanced out by the second supplementary setting angle, the axle geometry can be set particularly exactly to the desired axle geometry.

One possible refinement of the method proposes that after the renewed tightening of the lock nut and before the fifth setting process step, the pulse step is carried out once again and then a fifth axle geometry actual value is acquired. In this case, ascertaining a third supplementary setting angle, which functions as a third tolerance value, then follows the fifth setting process step. The third supplementary setting angle characterizes a difference between the fourth axle geometry actual value and the fifth axle geometry actual value here. The lock nut is then loosened and tightened again with the predetermined preliminary tightening torque, as is described, for example, in conjunction with the third setting process step. To set the axle geometry, first the target angle is ascertained for the eccentric element in that the axle geometry setpoint value setting angle, the first supplementary setting angle (i.e. the first tolerance value), the second supplementary setting angle (i.e. the second tolerance value), and the third supplementary setting angle (i.e. the third tolerance value) are summed or added. The eccentric element is then rotated by the target angle. After this, the lock nut is tightened again with the predetermined final tightening torque. In this way, an adjustment of the axle geometry which takes place after the pulsing of the vehicle axle due to the loading of the link assembly with 100% of the $K_0$ force is balanced out or eliminated by the third supplementary setting angle, i.e. by the third tolerance value. The axle geometry setting can thus be equalized even more accurately to the desired axle geometry setting.

According to a further possible embodiment of the method, the setting process comprises a seventh setting process step, which follows the sixth setting process step. In the seventh setting process step, the third setting process step, the fourth setting process step, the fifth setting process step, and the sixth setting process step—possibly including some sub-process steps—are carried out again if the final axle geometry actual value and the axle geometry setpoint value deviate from one another by more than a predetermined limiting deviation. The seventh setting process step is repeated here until either a predetermined repetition number is reached or until the final axle geometry actual value and the axle geometry setpoint value deviate from one another at most by the predetermined limiting deviation, depending on which occurs first. The axle geometry setting can thus advantageously be performed even more accurately by way of the method.

According to a further possible embodiment of the method—provided the setting of the axle geometry comprises the setting of the camber value and the toe value—the toe setting and the camber setting of the vehicle axle to be set are set in a common setting process. It can be provided, for example, that the toe setting and the camber setting are set in the fourth setting process step in succession or at least partially simultaneously. In this way, the method is made particularly efficient, due to which a cycle time for setting the axle geometry setting is advantageously particularly short.

In the fourth setting process step, it is provided in this context according to a further possible embodiment of the method that first the camber setting and then the toe setting is carried out. This is related to the fact that a desired camber setting is predetermined with a higher setting tolerance than the desired toe setting. Moreover, the setting of the toe and the setting of the camber are not to be carried out independently of one another, because an adjustment of the camber results—although it is only to a particularly minor extent—in an adjustment of the toe and vice versa. In other words, the toe and the camber cannot be completely decoupled or set completely independently of one another. In that the toe is thus set after the camber, the camber setting does change, but remains within the predetermined tolerance.

In the method, it is provided in a further possible embodiment that the training process in the case of the vehicle axle series is carried out on the first vehicle axle to be set of the vehicle axle series, wherein the training process is omitted on a second vehicle axle of the same vehicle axle series to be set subsequently. The first supplementary angle of the first vehicle axle is used here to set the axle geometry value of the second vehicle axle. The vehicle axle designated as the second vehicle axle does not necessarily have to be set by way of the method directly after the first vehicle axle to be set. The second vehicle axle only bears the corresponding numeral for simpler addressing. Accordingly, the setting of one further vehicle axle or multiple further vehicle axles can take place between the setting of the first vehicle axle and the setting of the second vehicle axle. The training process can moreover be omitted in further vehicle axles to be set of the same vehicle axle series.

In particular, it can be provided in the method that the training process is only carried out a single time per vehicle axle series, namely on the first vehicle axle to be set of the vehicle axle series. In that the training process is thus omitted for the following vehicle axles after the first vehicle axle to be set, the total duration for setting all vehicle axles of the vehicle series is shortened drastically.

The omission of the training process for a vehicle axle other than the first one to be set is not contradictory to a further possible embodiment of the method, according to which it is provided that the training process is repeated on another, for example, third vehicle axle to be set of the vehicle axle series. The vehicle axle designated as the third vehicle axle does not necessarily have to be set by the method directly after the second vehicle axle to be set. The third vehicle axle only bears the corresponding numeral for simpler addressing. Accordingly, the setting of one further vehicle axle or multiple further vehicle axles can take place between the setting of the second vehicle axle and the setting of the third vehicle axle. Moreover, the setting of the third vehicle axle can take place between the setting of the first vehicle axle and the setting of the second vehicle axle. In that the training process is repeated once or multiple times, the first supplementary setting angle can be refined more and more in the course of the setting of the vehicle axles of the vehicle axle series.

It is generally provided in the above-described embodiments of the method that the first supplementary setting angle and the second supplementary setting angle are stored and are offset with the second supplementary angle or third supplementary angle of a vehicle axle to be set subsequently of the same vehicle axle series, so that during the course of the method the second supplementary setting angle and the third supplementary setting angle are successively refined. A mathematical algorithm is in particular used for this purpose.

It is to be understood that the rotation of the eccentric element around the axle geometry setpoint value setting angle can take place, and following this a rotation of the eccentric element around the supplementary setting angle or angles can take place. The axle geometry is preferably set in that the eccentric element is rotated once, specifically directly by the target angle. For this purpose, the axle geometry setpoint value setting angle and the supplementary setting angle or angles are offset with one another. If the rotation of the eccentric element by the axle geometry setpoint value setting angle comprises, for example, rotating the eccentric element by +90°, wherein the first supplementary setting angle is −2°, the second supplementary setting angle is +5°, and the third supplementary setting angle is −1.7°, the eccentric element can be rotated by the target angle directly or by way of a single rotation by +91.3°. The values are solely by way of example.

Further features of the disclosure can result from the claims, the figures, and the description of the figures. The features and combinations of features mentioned above in the description and the features and combinations of features solely shown hereinafter in the description of the figures and/or in the figures are usable not only in the respective specified combination, but also in other combinations or alone, without departing from the scope of the disclosure.

BRIEF DESCRIPTION OF THE DRAWINGS

In the figures, identical and functionally-identical elements are provided with the same reference signs.

DETAILED DESCRIPTION OF THE DRAWINGS

A method and an axle geometry setting system 1 for standard setting of an axle geometry of vehicle axles 2 of a vehicle axle series are described in a joint description hereinafter. The steps of the method represent code components or control commands of a computer program which cause a control unit of the axle geometry setting system 1 to carry out the method. In other words, the computer program is a control program for the axle geometry setting system 1. The program-controlled control unit of the axle geometry setting system 1 is used for the control/regulation of the axle geometry setting system 1, in particular its tools, manipulators, etc. This means that due to execution or processing of the computer program by way of the control unit, it provides output control commands which characterize steps of the method, so that the axle geometry setting system 1 is controlled and/or regulated according to the method steps or to carry out the method steps. The computer program is stored, for example, on a computer-readable storage medium.

In the following description, the method for standard setting of the axle geometry, which is produced by way of the method or by way of the axle geometry setting system 1 on the vehicle axle 2, and the axle geometry setting system 1 are described on the basis of the example of a joint toe and camber setting. In the present example, a toe and a camber of the vehicle axle 2 to be set are set in a joint setting process E of the method. Accordingly, the setting of the vehicle axle 2 to the desired axle geometry setting comprises the setting of a desired camber and the setting of a desired toe. A trace code SC is provided to the method, which characterizes the desired axle geometry, i.e. the trace code SC contains in the present example data about a desired camber value and about a desired toe value for the vehicle axles 2 of the vehicle axle series. The trace code SC comprises, for example, an axle geometry setpoint value.

Figure 2:
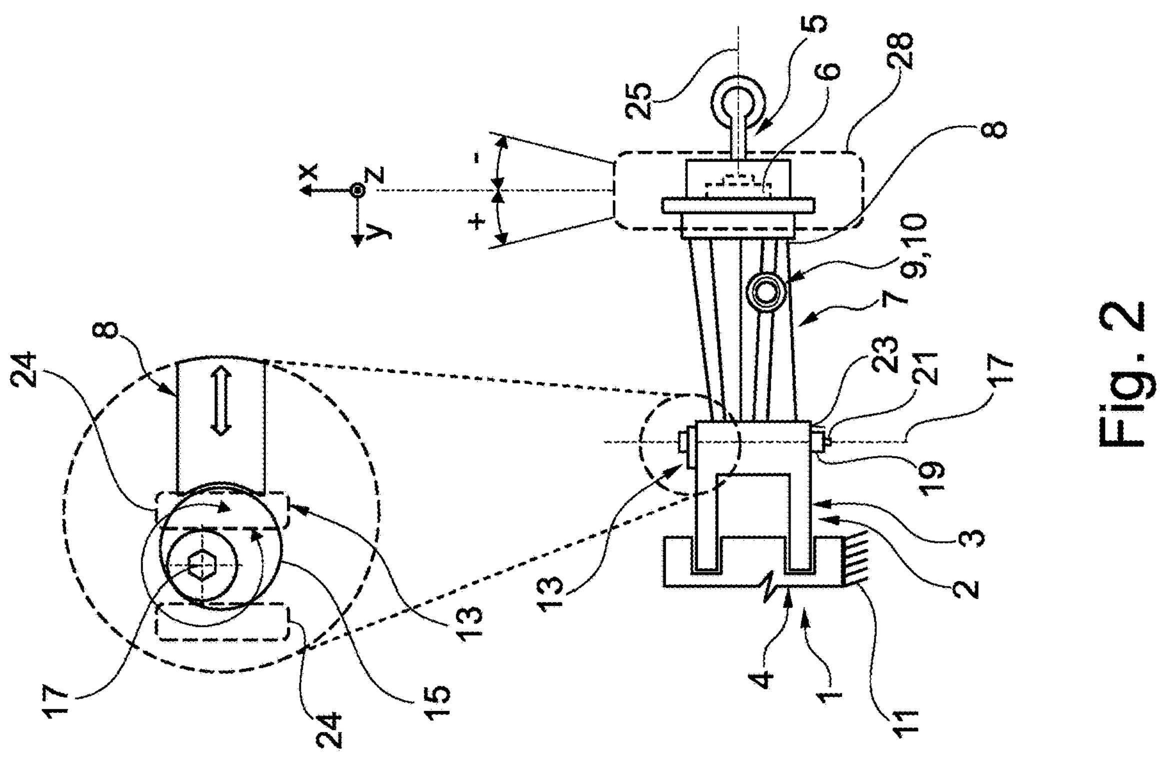
FIG. 2 shows a schematic view of the vehicle axle shown in FIG. 1 along a vertical axis z; and, FIG. 3 shows a flow chart to illustrate the steps of the method.
Figure 1:
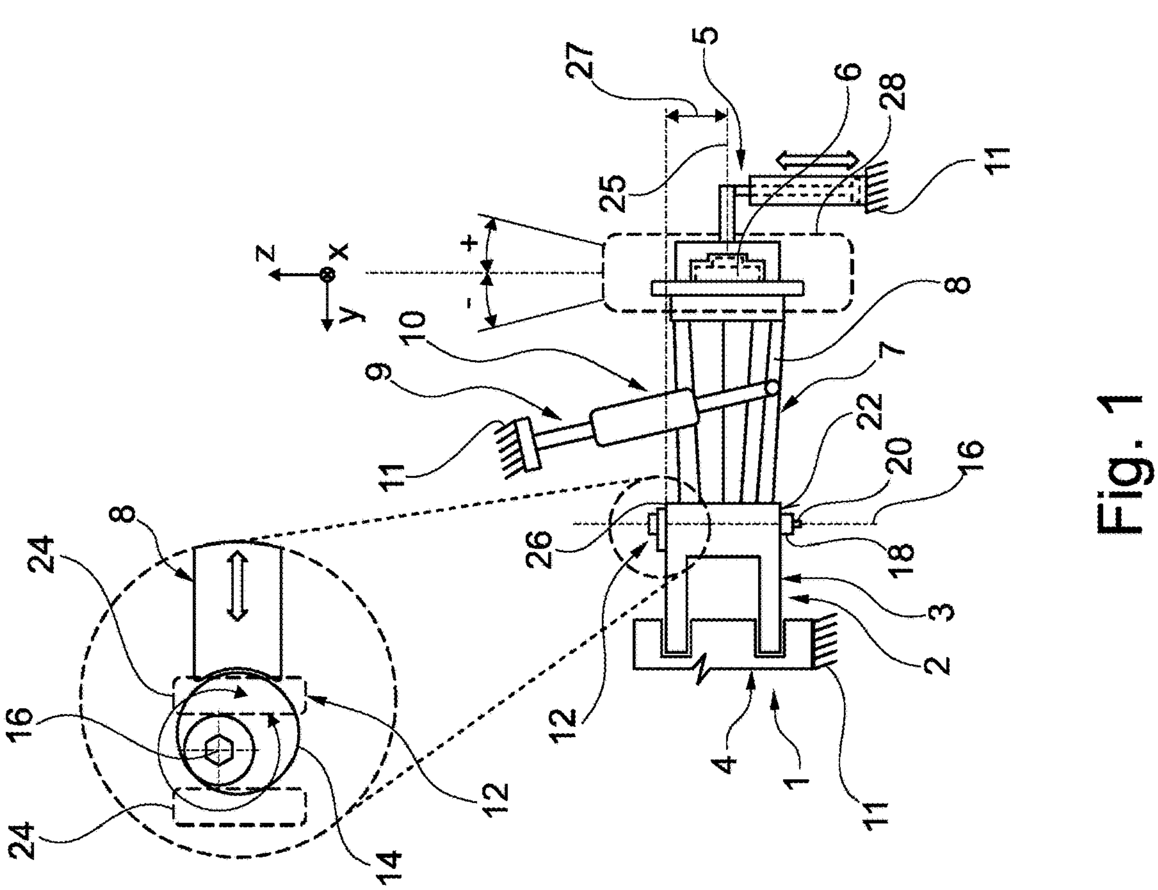
FIG. 1 shows a schematic view of a vehicle axle along a longitudinal axle x, wherein the vehicle axle is connected to an axle geometry setting system to set in axle geometry, by way of which a method for standard setting of the axle geometry of vehicle axles of a vehicle axle series is carried out.

FIG. 1 shows a schematic view of the vehicle axle 2 to be set, wherein the vehicle axle 2 is connected to the axle geometry setting system 1, by way of which the method for standard setting of the axle geometry of the vehicle axles 2 of the vehicle axle series is carried out, to set the axle geometry—in FIG. 1 the camber. In FIG. 1, a longitudinal direction x of a setting system coordinate system extends perpendicularly into the plane of the drawing. FIG. 2 shows the vehicle axle 2 connected to the axle geometry setting system 1 to set the axle geometry—in FIG. 2 the toe—wherein a vertical direction z of the setting system coordinate system extends perpendicularly out of the plane of the drawing. The setting system coordinate system and a coordinate system of the vehicle axle and/or a vehicle coordinate system of a motor vehicle which is to be equipped with the set vehicle axle 2 can coincide.

The vehicle axle 2 is connected to the axle geometry setting system 1 to set the axle geometry in that an axle carrier 3 of the vehicle axle 2 is connected to an axle carrier receptacle 4 of the axle geometry setting system 1. In the present case, the axle geometry setting system 1 comprises a hub lifter 5, which is configured to move a wheel hub 6 of the vehicle axle 2, in particular along the vertical direction z. A link assembly 7 of the vehicle axle 2 connects the wheel hub 6 (via wheel bearing and wheel carrier) and the axle carrier 3. A respective link 8 of the link assembly 7 is connected both to the axle carrier 3 and to the wheel hub 6, so that the wheel hub 6 is linked by way of the link assembly 7 or by way of the links 8 on the axle carrier 3. The axle geometry setting system 1 moreover comprises a spring-loading unit 9 having a loading spring 10. The spring-loading unit 9 is fixed firmly in position in relation to a housing 11 of the axle geometry setting system 1 using a setting system-side end. An axle-side end of the spring-loading unit 9 is connected or connectable to the link assembly 7, i.e. to one of the links 8 of the link assembly 7, to the wheel hub 6, or to the wheel carrier, so that the vehicle axle 2 or the link assembly 7 can be loaded with a force by way of the spring-loading unit 9. For this purpose, the spring-loading unit 9 is designed as adjustable in length, in particular extendable and/or retractable. For example, the spring-loading unit 9 comprises a ram, which presses on one or more of the links 8 of the link assembly 7, the wheel hub 6, or the wheel carrier with sufficient length setting.

In order to be able to set the camber (see FIG. 1) and the toe (see FIG. 2) of the vehicle axle 2, the vehicle axle 2 comprises a first setting eccentric unit 12 and a second setting eccentric unit 13. The first setting eccentric unit 12 interacts with one or more of the links 8 of the link assembly 7, specifically with the one or the ones of the links 8 which is/are to be adjusted to adjust the toe setting of the vehicle axle 2. In contrast, the second setting eccentric unit 13 interacts with one or more of the links 8 of the link assembly 7, specifically with the one or ones of the links 8 which is/are to be adjusted to adjust the toe setting of the vehicle axle 2. A respective detail view of the setting eccentric units 12, 13 is shown in FIGS. 1 and 2. In principle, other/further ones of the links 8 could be used for the toe or camber setting; which of the links 8 is adjusted in the context of the method is a question of accessibility, the influence on the value to be set, or the mutual influence on one another.

It is to be understood that the setting eccentric units 12, 13—although these are shown in FIG. 1 or FIG. 2 along the Z or X axis, respectively—can also be arranged differently, in particular diagonally in relation to one or more of the spatial axes x, y, z. For example, it can be provided that both setting eccentric units 12, 13 extend at least essentially along a common one of the spatial directions x, y, z, but in any case, act here on different links 8 of the link assembly 7. Furthermore, the setting eccentric units 12, 13 can be arranged parallel to one another. In particular, both setting eccentric units 12, 13 are arranged approximately in the X direction. A camber or toe setting then results (on the example of a multi-link vehicle axle) due to the position of the correspondingly connected link 8 in space or due to the effective length of the corresponding links 8 represented by the setting eccentric unit 12 or 13.

It can be seen that with a rotation of a respective eccentric element 14, 15 of the respective setting eccentric unit 12, 13, the link 8 interacting with the respective setting eccentric unit 12, 13 is adjusted along a transverse direction y of the vehicle axis 2 or the axle geometry setting system 1. The eccentric element 14, 15 is known to pivot here around a respective eccentric axis 16, 17. The axle geometry setting system 1 comprises corresponding screwdriver tools here in the example to rotate the eccentric elements 14, 15. The respective setting eccentric unit 12, 13 comprises a respective lock nut 18, 19 to secure the axle geometry setting, which can be screwed onto a correspondingly associated lock threaded bolt 20, 21 of the respective setting eccentric unit 12, 13. In that the lock nut 18, 19 is tightened on a corresponding lock nut contact surface 22, 23 of the axle carrier 3 with screwing onto the lock threaded bolt 20, 21, the correspondingly associated eccentric element 14, 15 is secured against rotation. To rotate the lock nuts 18, 19, the axle geometry setting system 1 comprises further corresponding screwdriver tools in the example here. The vehicle axle 2, in particular the axle carrier 3, moreover comprises eccentric support elements 24, on which the respective eccentric element 14, 15 adjoins, so that the corresponding eccentric element 14, 15 is be secured in position by way of the eccentric support elements 24.

Figure 3:
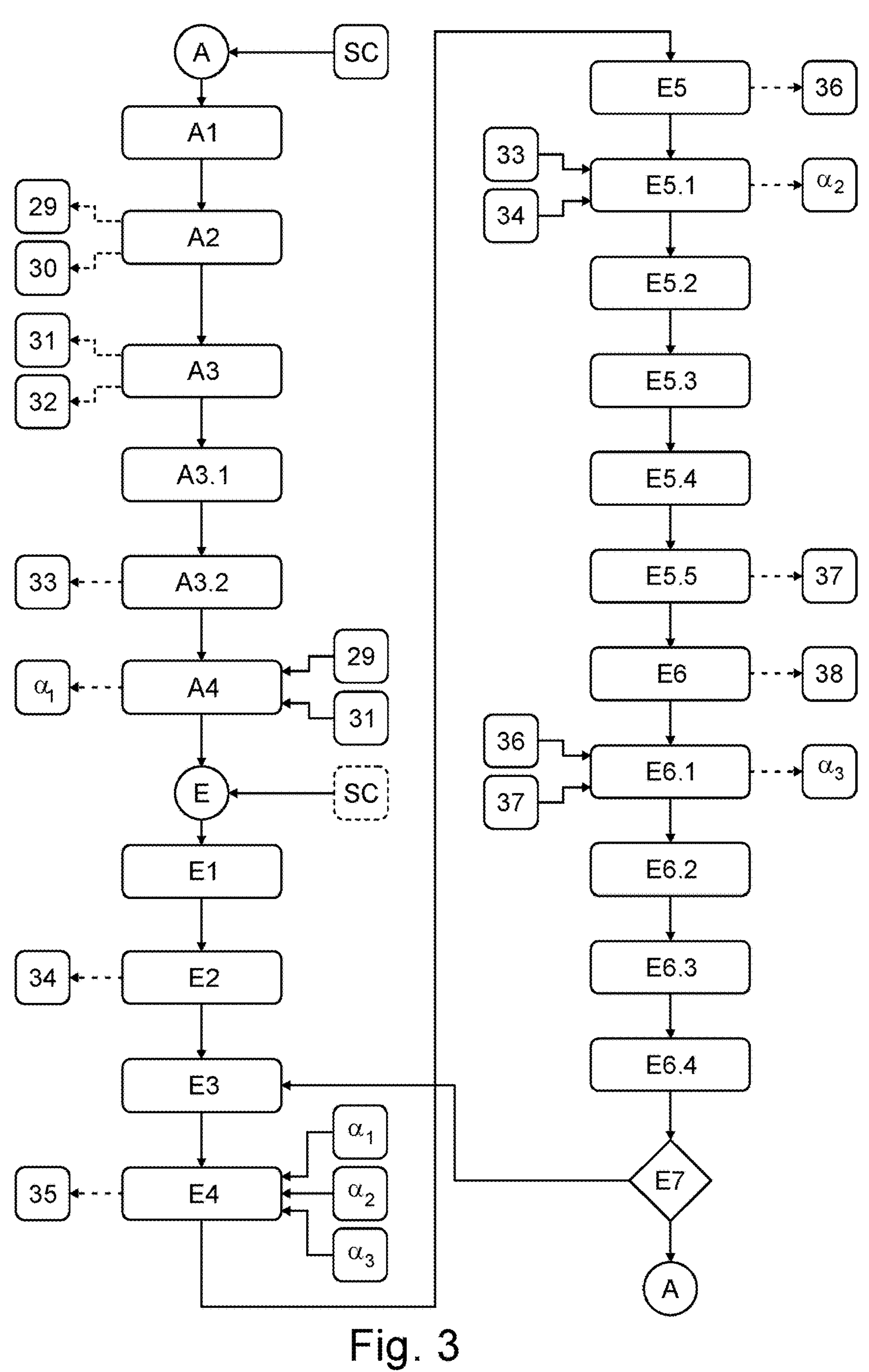

FIG. 3 shows a flow chart to illustrate the method, in which the steps of the method are listed. In a training process A of the method, the training process steps Al to A4 and in the present case the training process steps A3.1 and A3.2 are carried out on a first vehicle axle 2 to be set of the vehicle axle series. In first training process step A1, the link assembly 7 of the vehicle axle 2 to be set is adjusted by way of the hub lifter 5 into a series-specific $K_0$ position. At the $K_0$ position, the wheel hub 6, in particular its longitudinal center axis 25, and an axle carrier-side fixed point 26 are spaced apart from one another over a $K_0$ distance 27 along the vertical direction z. The fixed point 26 for example is an upper edge of the axle carrier 3, an axle carrier-side linkage point for one or more of the links 8, and axle carrier bearing (via which the vehicle axle 2 and a frame of the motor vehicle are fastened on one another), etc. The distance between the wheel hub 6 and the axle carrier-side fixed point 26 is simulated by the $K_0$ distance in the vehicle axle 2, which the vehicle axle 2 would adopt when it is loaded in the intended installation position with a mass of the motor vehicle.

By way of the loading spring 10 of the spring-loading unit 9, in a second training process step A2, the link assembly 7 is loaded with a predetermined fraction of a series-specific predetermined $K_0$ force. The force application is in particular carried out by way of a spindle of the spring-loading unit 9, which presses the loading spring 10 (in the example here counter to the Z direction, thus downward) onto the corresponding link 8, the wheel hub 6, or the wheel carrier. The force flow runs here via the loading spring 10. The fraction of the $K_0$ force with which the link assembly 7 is loaded in the second training process step A2 is in the present example 35% of the $K_0$ force. The complete $K_0$ force, thus 100% of the $K_0$ force, corresponds to the force which acts on the steering assembly 7 if the relevant vehicle axle 2 is connected is intended to the frame of the motor vehicle, which stands or rests via its wheels 28 (indicated in FIG. 1 and in FIG. 2) on the ground. In second training process step A2, furthermore a first axle geometry actual value 29 is acquired and stored. In particular, in training process step A2, moreover a first force-distance value pair 30 is acquired, which characterizes a tensioning travel of the loading spring 10 until reaching the fraction of the $K_0$ force.

In a third training process step A3, the link assembly 7 is held in the $K_0$ position. The link assembly 7 is loaded with 100% of the $K_0$ force by way of the loading spring 10 in this case. Furthermore, in third training process step A3, a second axle geometry actual value 31 is acquired, and moreover a second force-distance value pair 32, which characterizes a tensioning travel of the loading spring 10 until reaching the $K_0$ force, can be acquired in third training process step A3.

This is followed in the present example by training process step A3.1, in which the link assembly 7 is adjusted into a pulse deflection position by way of the hub lifter 5, in which the wheel hub 6 and the fixed point 26 are spaced apart from one another over a pulse peak distance along the vertical direction z. This is followed by a further training process step A3.2, wherein the link assembly 7 is loaded with a predetermined pulse deflection force by way of the loading spring 10, wherein the link assembly 7 is held by way of the hub lifter 5 in the pulse deflection position. Moreover, a third force-distance value pair 33, which characterizes a tensioning travel of the loading spring 10 until reaching the pulse deflection force, can furthermore be acquired in training process step A3.2. Training process steps A3.1 and A3.2 take place after third training process step A3 and before a fourth training process step A4.

Third training process step A3, in the present example training process step A3.2, is followed by fourth training process step A4, in which a first supplementary setting angle ai is ascertained, which characterizes a difference between the first axle geometry actual value 29 and the second axle geometry actual value 31. The first axle geometry actual value 29 is thus measured in second training process step A2 and the second axle geometry actual value 31 is measured in third training process step A3 and they are compared with one another, for example, by way of a predetermined mathematical algorithm. Since the rotation of the corresponding eccentric element 14, 15 by a specific angle results in an adjustment, related to this rotation, of the link 8 interacting with the corresponding setting eccentric unit 12, 13, the first supplementary setting angle $\alpha_{1\ c}$an be ascertained. The first supplementary setting angle $\alpha_1$, which is a first tolerance value, is intended to equalize a difference between the axle geometry setting represented with the link assembly 7 loaded with 100% of the $K_0$ force, and the axle geometry setting as is represented with the link assembly 7 loaded with the predetermined fraction (here 35%) of the $K_0$ force. This means that the first setting supplementary angle ai is employed or used for the ultimate setting of the vehicle axle 2 to the desired axle geometry setting. For this purpose, in the setting process E of the method for setting the desired axle geometry, the corresponding eccentric element 14, 15 of the associated setting eccentric unit 12, 13 is rotated by a target angle corresponding to the desired axle geometry. This is ascertained in that a setting angle corresponding with the axle geometry setpoint value (axle geometry setpoint value setting angle) and the first supplementary setting angle $\alpha_1$, i.e. the first tolerance value, are summed or added. In the setting process E, the corresponding eccentric element 14, 15 is rotated by the target angle. It is to be understood that the axle geometry setpoint value does not yet correspond with the desired axle geometry as is supposed to result in the completed motor vehicle, i.e. when the motor vehicle body rests on the ground via the vehicle axle 2 and via the wheels 28. This is because in order to achieve this—for example, after the corresponding eccentric element 14, 15 has been rotated by the axle geometry setpoint value setting angle—the corresponding eccentric element 14, 15 is rotated by the first supplementary setting angle $\alpha_1$, so that the corresponding eccentric element 14, 15 is ultimately adjusted into the desired axle geometry setting with a rotation of the eccentric element 14, 15 by the target angle. The eccentric element 14, 15 is preferably rotated directly by the target angle, i.e. it is calculated before the rotation of the eccentric element 14, 15 on the basis of the first supplementary setting angle ai how far the eccentric element 14, 15 has to be rotated in order to be adjusted directly by the target angle.

In the method, it is generally provided that the training process A, i.e. in the present example training process steps Al to A4, is carried out in any case on the first vehicle axle 2 to be set of the vehicle axle series. The training process A can be omitted on one or more or all of the following vehicle axles 2 to be set of the same vehicle axle series. The first supplementary angle $\alpha_1$, which was ascertained in the context of the training process A on the first vehicle axle 2, is then used here for setting the axle geometry setting on further vehicle axles 2 of the same vehicle axle series. This means that it can be provided in the method that the training process A is carried out precisely once, namely on the first vehicle axle 2 to be set of the vehicle axle series. Alternatively, the training process A is repeated on one or more of the other vehicle axles 2 to be set of the same vehicle axle series. It can be provided, for example, that the training process A is carried out periodically, for example, every five vehicle axles 2, every ten vehicle axles 2, etc., wherein the training process A is omitted for the other vehicle axles 2 to be set.

If the training process A is carried out before the setting process E, it is provided in particular in the method that the vehicle axle 2 to be set is removed from the axle geometry setting system 1 after the fourth training process step A4 and then newly inserted or checked in the axle geometry setting system 1, for example, to reset the axle geometry setting system 1. In the present case, the setting process E is designed as follows: In a first setting process step E1, which is referred to as a pulse step, the link assembly 7 is pulsed or shaken in that initially the link assembly 7 is adjusted by way of the hub lifter 5 into the $K_0$ position. The link assembly 7 is loaded here with the predetermined fraction—thus 35% here—of the $K_0$ force by way of the loading spring 10. The link assembly 7 is then adjusted by way of the hub lifter 5 into the pulse deflection position, wherein the link assembly 7 is loaded with the pulse deflection force by way of the loading spring 10. The link assembly 7 is adjusted back into the $K_0$ position after this and loaded with the predetermined fraction, thus 35%, of the $K_0$ force. This pulse step is in particular executed multiple times in succession at high frequency, so that the link assembly 7 or the vehicle axle 2 is pulsed or shaken. A suspension operation of the vehicle axle 2 is simulated by the pulsing of the vehicle axle 2. In other words, during the pulsing of the vehicle axle 2, forces, torques, and pulses are stimulated at a frequency which acts or can act on the vehicle axle 2 in the completed motor vehicle in driving operation. In the present example, it is provided that pulse step El or first setting process step El is carried out five times in direct succession. First setting process step El furthermore includes here in the example that an axle geometry output value 34 of the link assembly 7, which is adjusted after the pulsing into the $K_0$ position and is loaded with the $K_0$ force, is acquired.

First setting process step E1 is followed by a second setting process step E2, in which an axle geometry output value for the further method is acquired or measured.

In a third setting process step E3, the corresponding lock nut 18, 19 of the associated setting eccentric unit 12, 13 is loosened, which means that the corresponding lock nut 18, 19 is screwed away/unscrewed from the associated lock nut contact surface 22, 23 along the associated lock threaded bolt 20, 21. After this, the lock nut 18, 19 is driven long enough or far enough in the clamping direction, i.e. screwed onto the lock threaded bolt 20, 21, that the lock nut 18, 19 rests on the associated lock nut contact surface 22, 23 and a torque which has to act on the lock nut 18, 19 to drive it has reached a predetermined tightening torque, in the present case 10 Nm. In third setting process step E3, a defined position or a defined torque of the lock nut 18, 19 is thus set so that then the rotation of the corresponding eccentric element 14, 15 can take place.

In a fourth setting process step E4, the eccentric element 14, 15 is rotated by the target angle. Furthermore, fourth setting process step E4 includes that—after the eccentric element 14, 15 has been rotated by the target angle—a third axle geometry actual value 35 is captured. In the present example, it is provided that the eccentric element 14, 15 is first rotated by a rough angle corresponding roughly to the target angle and later by a fine angle corresponding more accurately to the target angle. This means that the corresponding eccentric element 14, 15 is first rotated roughly by the target angle corresponding with the axle geometry setpoint value and later finely adjusted in order to set the target angle exactly. In particular, the fine adjustment of the eccentric element 14, 15 can take place directly after the rough rotation of the eccentric element 14, 15. In the present case, first the camber is set and then the toe.

In a fifth setting process step E5, the lock nut 18, 19 is then tightened with a predetermined final tightening torque, by which the eccentric element 14, 15 is locked or blocked against further rotation or adjustment. Expressed in simplified terms, the corresponding eccentric element 14, 15 is locked by the tightening of the associated lock nut 18, 19. After the locking of the corresponding eccentric element 14, 15, a fourth axle geometry actual value 36 is moreover acquired in fifth setting process step E5.

Fifth setting process step E5 is followed in the present example by setting process steps E5.1, E5.2, E5.3, E5.4, and E5.5. After the tightening of the lock nut 18, 19 using the predetermined final tightening torque and the acquisition of the fourth axle geometry actual value 36, in setting process step E5.1, a second supplementary setting angle az functioning as a second tolerance value is ascertained. The second supplementary setting angle $\alpha_2$ characterizes a difference between the third axle geometry actual value 35, which was ascertained in fourth setting process step E4, and the fourth axle geometry actual value 36, which was ascertained in fifth setting process step E5. The axle geometry actual values 35, 36 are thus compared with one another by way of the predetermined mathematical algorithm or by way of a further predetermined mathematical algorithm, by which the second supplementary setting angle $\alpha_2$ is ascertained. In setting process step E5.2, the lock nut 18, 19 is then loosened and tightened again using the predetermined preliminary tightening torque, as has already been described in conjunction with setting process step E3. This is followed by setting process step E5.3, in which the eccentric element 14, 15 is rotated by the target angle. The target angle is previously ascertained here in that the axle geometry setpoint value setting angle, the first supplementary setting angle ($\alpha_1$), and the supplementary setting angle ($\alpha_2$) are summed or added. After this, the lock nut 18, 19 is tightened again in setting process step E5.4 using the predetermined final tightening torque. In the present example, setting process step E5.4 is followed by setting process step E5.5, in which first setting process step E1, i.e. the pulse step, is carried out once again and then a fifth axle geometry actual value 37 is acquired.

In a sixth setting process step E6, which is followed in the present example by setting process steps E6.1, E6.2, E6.3, and E6.4, the link assembly 7 is then loaded with 100% of the $K_0$ force by way of the loading spring 10. Moreover, a final axle geometry actual value 38 is acquired in setting process step E6.

Subsequently to sixth setting process step E6, setting process step E6.1 follows, in which a third supplementary setting angle $\alpha_3$ is ascertained, which characterizes a difference between the fourth axle geometry actual value 36 and the fifth axle geometry actual value 37. In following setting process step E6.2, the lock nut 18, 19 is then loosened and tightened again using the predetermined preliminary tightening torque, as described in conjunction with setting process step E3. In setting process step E6.3, which follows setting process step E6.2, the eccentric element 14, 15 is then rotated by the target angle. The target angle is previously ascertained here in that the axle geometry setpoint value setting angle, the first supplementary setting angle ($\alpha_1$), the second supplementary setting angle ($\alpha_2$), and the third supplementary setting angle ($\alpha_3$) are summed or added. In setting process step E6.4, the lock nut 18, 19 is then tightened again using the predetermined final tightening torque.

Alternatively to a direct or single-stroke rotation of the eccentric element 14, 15 directly by the target angle, it can be provided that the eccentric element 14, 15 is rotated by way of a first rotation by the axle geometry setpoint value setting angle. The eccentric element 14, 15 is then rotated by the first tolerance value or first supplementary setting angle ai by way of a second rotation, which takes place after completion of the first rotation. After completion of the second rotation, the eccentric element 14, 15 is then rotated by way of a third rotation by the second tolerance value or second supplementary setting angle $\alpha_2$. After completion of the third rotation, a fourth rotation can then be carried out in order to rotate the eccentric element 14, 15 by the third supplementary setting angle $\alpha_3$. A single supplementary angle rotation is also conceivable, which follows the first rotation, wherein during the supplementary angle rotation, the eccentric element 14, 15 is rotated by the sum of the supplementary setting angles $\alpha_1$, $\alpha_2$, $\alpha_3$.

In the present example, setting process step E6.4 is followed by a seventh setting process step E7, in which it is ascertained whether the final axle geometry actual value 38 and the axle geometry setpoint value which is stored in the trace code SC deviate from one another by more than a predetermined limiting deviation. If this is the case, the method is carried out again by carrying out setting process steps E3 to E6 again, in particular E6.4. In contrast, if it is established in seventh setting process step E7 that the final axle geometry actual value 38 and the axle geometry setpoint value deviate from one another at most by the predetermined limiting deviation, the axle geometry setting of the vehicle axle 2 is considered completed. Moreover, it is provided in conjunction with seventh setting process step E7 that a repetition number is specified which states how often setting process step E7, i.e. setting process steps E3 to E6, are permitted to be carried out again. If the predetermined repetition number is reached, wherein the final axle geometry actual value 38 and the axle geometry setpoint value still deviate from one another by more than the predetermined limiting deviation, the corresponding vehicle axle 2 is withdrawn from the method, possibly reworked (replacement of screw elements, in particular the eccentric elements 14, 15, the lock nuts 18, 19, etc.), and possibly supplied to the method from the beginning.

A respective possibility is disclosed by the method described herein and by the axle geometry setting system 1 for how an axle geometry setting can be performed automatically in the context of a series production of vehicle axles particularly reliably and with particularly high repetition quality and with uniform low tolerance deviation.

LIST OF REFERENCE SIGNS

1 axle geometry setting system
2 vehicle axle
3 axle carrier
4 axle carrier receptacle
5 hub lifter
6 wheel hub
7 link assembly
8 link
9 spring-loading unit
10 loading spring
11 housing
12 first setting eccentric unit
13 second setting eccentric unit
14 first eccentric element
15 second eccentric element
16 first eccentric axis
17 second eccentric axis
18 first lock nut
19 second lock nut
20 first lock threaded bolt
21 second lock threaded bolt
22 first lock nut contact surface
23 second lock nut contact surface
24 eccentric support element
25 longitudinal center axis of the wheel hub
26 fixed point
27 $K_0$ distance
28 wheel
29 first axle geometry actual value
30 first force-distance value pair
31 second axle geometry actual value
32 second force-distance value pair
33 third force-distance value pair
34 axle geometry output value
35 fourth axle geometry actual value
36 fifth axle geometry actual value
37
A training process
A1-A4 steps of the training process
E setting process
E1-E7 steps of the setting process
SC trace code
$\alpha_1$ first supplementary setting angle
$\alpha_2$ second supplementary setting angle
$\alpha_3$ third supplementary setting angle
X longitudinal direction
y transverse direction
Z vertical direction

The invention claimed is:

1. A method for standard setting of an axle geometry of vehicle axles of a vehicle axle series, wherein in a training process of the method, the following training process steps are carried out on a first vehicle axle to be set of the vehicle axle series:

A1 adjusting, by way of a hub lifter, a link assembly of the vehicle axle to be set in a series-specific $K_0$ position, in which a wheel hub of the vehicle axle and an axle carrier-side fixed point of the link assembly are spaced apart from one another along the vertical direction over a $K_0$ distance, A2 loading, by way of a loading spring, the link assembly with a predetermined fraction of a series-specific predetermined $K_0$ force and acquiring a first axle geometry actual value, A3 holding the link assembly in the $K_0$ position, wherein the link assembly is loaded with 100% of the $K_0$ force by way of the loading spring, and acquiring a second axle geometry actual value, A4 ascertaining a first supplementary setting angle ($\alpha_1$), which characterizes a difference between the first axle geometry actual value and the second axle geometry actual value, wherein a target angle corresponding with the axle geometry setting is ascertained for an eccentric element of a setting eccentric unit of the vehicle axle, in that a setting angle corresponding with an axle geometry setpoint value and the first supplementary setting angle ($\alpha_1$) are summed, and wherein in a setting process (E) of the method for setting the axle geometry setting, the eccentric element is rotated by the target angle.

2. The method according to claim 1, wherein the following training process steps are carried out between training process steps A3 and A4:

A3.1 adjusting, by way of the hub lifter, the link assembly into a pulse deflection position, in which the wheel hub and the fixed point are spaced apart from one another over a pulse peak distance along the vertical direction, A3.2 holding the link assembly in the pulse deflection position, wherein the link assembly is loaded with a predetermined pulse deflection force by way of the loading spring, and the following setting process steps are carried out in the setting process (E) of the method:

E1 a pulse step, in which the link assembly is pulsed, in that by way of the hub lifter, the link assembly is adjusted into the $K_0$ position, wherein the link assembly is loaded with the predetermined fraction of the $K_0$ force by way of the loading spring, by way of the hub lifter, the link assembly is adjusted into the pulse deflection position, wherein the link assembly is loaded with the pulse deflection force by way of the loading spring, the link assembly is adjusted back into the $K_0$ position and loaded with the predetermined fraction of the $K_0$ force, E2 acquiring an axle geometry output value, E3 loosening a lock nut of the setting eccentric unit and then tightening the lock nut using a predetermined preliminary tightening torque, E4 rotating the eccentric element by the target angle, and acquiring a third axle geometry actual value, E5 tightening the lock nut using a predetermined final tightening torque and acquiring a fourth axle geometry actual value, E6 loading the link assembly with 100% of the $K_0$ force by way of the loading spring, and acquiring a final axle geometry actual value.

3. The method according to claim 2, wherein the target angle is first set to a rough setting value and is later set to a fine setting value.

4. The method according to claim 2, wherein between setting process steps E5 and E6:

E5.1 a second supplementary setting angle (a2) is ascertained, which characterizes a difference between the third axle geometry actual value and the fourth axle geometry actual value, E5.2 the lock nut is loosened and tightened again using the predetermined preliminary tightening torque, E5.3 the target angle for the eccentric element is ascertained in that the setting angle corresponding to the axle geometry setpoint value, the first supplementary setting angle ($\alpha_1$) and the supplementary setting angle ($\alpha_2$) are summed, and then the eccentric element is rotated by the target angle, E5.4 the lock nut (18, 19) is tightened using the predetermined final tightening torque.

5. The method according to claim 4, wherein between setting process steps E5.4 and E5:

E5.5 pulse step E1 is carried out once again and then a fifth axle geometry actual value is acquired, and following setting process step E6:

E6.1 a third supplementary setting angle ($\alpha_3$) is ascertained, which characterizes a difference between the fourth axle geometry actual value and the fifth axle geometry actual value, E6.2 the lock nut is loosened and tightened again using the predetermined preliminary tightening torque, E6.3 the target angle for the eccentric element is ascertained in that the setting angle corresponding to the axle geometry setpoint value, the first supplementary setting angle ($\alpha_1$), the supplementary setting angle ($\alpha_2$), and the supplementary setting angle ($\alpha_3$) are summed, and then the eccentric element is rotated by the target angle, E6.4 the lock nut is tightened using the predetermined final tightening torque.

6. The method according claim 2, wherein in the setting process:

E7 setting process steps E3 to E6 are carried out again if the final axle geometry actual value and axle geometry setpoint value deviate from one another by more than a predetermined limiting deviation, wherein setting process step E7 is repeated:

until a predetermined repetition number is reached or until the final axle geometry actual value and the axle geometry setpoint value deviate from one another at most by the predetermined limiting deviation, depending on which occurs first.

7. The method according claim 1, wherein:

the setting of the axle geometry comprises the setting of a camber of the vehicle axle, so that the method is used for setting a series-specific camber setting of the vehicle axles.

8. The method according to claim 1, wherein:

the setting of the axle geometry comprises the setting of a toe of the vehicle axle, so that the method is used for setting a series-specific toe setting of the vehicle axles.

9. The method according to claim 7, wherein:

the setting of the toe and the setting of the camber of the vehicle axle to be set are performed in a joint setting process (E).

10. The method according to claim 9, wherein:

in setting process step E4, first the camber is set and then the toe is set.

11. The method according to claim 1, wherein:

the training process (A) is carried out for the vehicle axle series on the first vehicle axle to be set of the vehicle axle series and the training process is omitted on a second vehicle axle of the same vehicle axle series to be set thereafter, wherein the first supplementary angle of the first vehicle axle is used to set the axle geometry of the second vehicle axle.

12. The method according to claim 1, wherein:

the training process (A) is repeated on another vehicle axle of the vehicle axle series to be set third.

13. An axle geometry setting system for standard setting of an axle geometry setting of vehicle axles of a vehicle axle series, wherein the axle geometry setting system is configured to carry out the method according to claim 1.

14. A computer program that comprises commands which cause the axle geometry setting system according to claim 13 to carry out steps (A1-A4, E1-E7) of the method according to claim 1.

15. A computer-readable storage medium, on which the computer program according to claim 14 is stored.

* * * * *